(12) United States Patent
Awasthi et al.

(10) Patent No.: US 12,552,883 B2
(45) Date of Patent: Feb. 17, 2026

(54) OPHTHALMIC DEVICES

(71) Applicant: Bausch + Lomb Ireland Limited, Dublin (IE)

(72) Inventors: Alok Kumar Awasthi, Pittsford, NY (US); Kristen Rae Hovinga, Honeoye Falls, NY (US); Emily Abrams Gabriel, Pittsford, NY (US); Kevin Jacob DeRyke, Webster, NY (US); Jade J. Russell, Perry, NY (US)

(73) Assignee: BAUSCH + LOMB IRELAND LIMITED, Dublin (IE)

( * ) Notice: Subject to any disclaimer, the term of this patent is extended or adjusted under 35 U.S.C. 154(b) by 869 days.

(21) Appl. No.: 17/836,299

(22) Filed: Jun. 9, 2022

(65) Prior Publication Data

US 2023/0096315 A1 Mar. 30, 2023

Related U.S. Application Data

(60) Provisional application No. 63/239,344, filed on Aug. 31, 2021.

(51) Int. Cl.
| | |
|---|---|
| *C08F 126/10* | (2006.01) |
| *A61L 27/50* | (2006.01) |
| *C08J 7/14* | (2006.01) |
| *C09B 62/83* | (2006.01) |

(52) U.S. Cl.
CPC ............ *C08F 126/10* (2013.01); *A61L 27/50* (2013.01); *C08J 7/14* (2013.01); *C09B 62/83* (2013.01); *A61L 2430/16* (2013.01); *C08F 2810/20* (2013.01); *C08J 2339/06* (2013.01)

(58) Field of Classification Search
None
See application file for complete search history.

(56) References Cited

U.S. PATENT DOCUMENTS

| | | | |
|---|---|---|---|
| 4,136,250 A | 1/1979 | Mueller et al. | |
| 4,153,641 A | 5/1979 | Deichert et al. | |
| 4,468,229 A * | 8/1984 | Su | D06P 3/008 |
| | | | 8/549 |
| 4,559,059 A | 12/1985 | Su | |
| 4,740,533 A | 4/1988 | Su et al. | |
| 4,891,046 A | 1/1990 | Wittmann et al. | |
| 4,910,277 A | 3/1990 | Bambury et al. | |
| 4,954,587 A | 9/1990 | Mueller | |
| 5,010,141 A | 4/1991 | Mueller | |
| 5,034,461 A | 7/1991 | Lai et al. | |
| 5,070,215 A | 12/1991 | Bambury et al. | |
| 5,079,319 A | 1/1992 | Mueller | |
| 5,260,000 A | 11/1993 | Nandu et al. | |
| 5,310,779 A | 5/1994 | Lai | |
| 5,321,108 A | 6/1994 | Kunzler et al. | |
| 5,358,995 A | 10/1994 | Lai et al. | |
| 5,387,662 A | 2/1995 | Kunzler et al. | |
| 5,449,729 A | 9/1995 | Lai | |
| 5,512,205 A | 4/1996 | Lai | |
| 5,610,252 A | 3/1997 | Bambury et al. | |
| 5,616,757 A | 4/1997 | Bambury et al. | |
| 5,708,094 A | 1/1998 | Lai et al. | |
| 5,710,302 A | 1/1998 | Kunzler et al. | |
| 5,714,557 A | 2/1998 | Kunzler et al. | |
| 5,908,906 A | 6/1999 | Kunzler et al. | |
| 5,944,853 A | 8/1999 | Molock et al. | |
| 6,550,915 B1 | 4/2003 | Grobe, III | |
| 6,794,456 B2 | 9/2004 | Grobe, III | |
| 7,915,323 B2 | 3/2011 | Awasthi et al. | |
| 7,994,356 B2 | 8/2011 | Awasthi et al. | |
| 8,420,711 B2 | 4/2013 | Awasthi et al. | |
| 8,703,891 B2 * | 4/2014 | Broad | G02B 1/043 |
| | | | 526/264 |
| 8,827,447 B2 | 9/2014 | Awasthi et al. | |
| 8,865,929 B2 | 10/2014 | Xu et al. | |
| 8,937,110 B2 | 1/2015 | Alli et al. | |
| 8,937,111 B2 | 1/2015 | Alli et al. | |
| 9,039,174 B2 | 5/2015 | Awasthi et al. | |
| 9,156,934 B2 | 10/2015 | Alli et al. | |
| 9,244,197 B2 | 1/2016 | Alli et al. | |

FOREIGN PATENT DOCUMENTS

| | | |
|---|---|---|
| CN | 113248466 A | 8/2021 |
| WO | 9631792 A1 | 10/1996 |
| WO | 2014110693 A1 | 7/2014 |
| WO | 2019212657 A1 | 11/2019 |

OTHER PUBLICATIONS

Lai, Yu-Chin, "The Role of Bulky Polysiloxanylalkyl Methacryates in Polyurethane-Polysiloxane Hydrogels," Journal of Applied Polymer Science, 1996, pp. 1193-1199, vol. 60.

* cited by examiner

*Primary Examiner* — Dominic Lazaro
(74) *Attorney, Agent, or Firm* — Michael E. Carmen; John E. Thomas

(57) ABSTRACT

A method for preparing an ophthalmic device for slowing, inhibiting or preventing myopia progression involves contacting an ophthalmic device having one or more reactive functional groups with one or more red-light blocking compounds having one or more reactive functional groups complementary to the one or more reactive functional groups of the ophthalmic device in a basic solution for a time period sufficient to covalently bond at least one reactive functional group of the ophthalmic device with at least one reactive functional group of the one or more red-light blocking compounds. The one or more red-light blocking compounds block greater than about 5% to about 25% of red-light transmission through the ophthalmic device at a wavelength of from about 550 nanometers (nm) to about 800 nm.

20 Claims, 1 Drawing Sheet

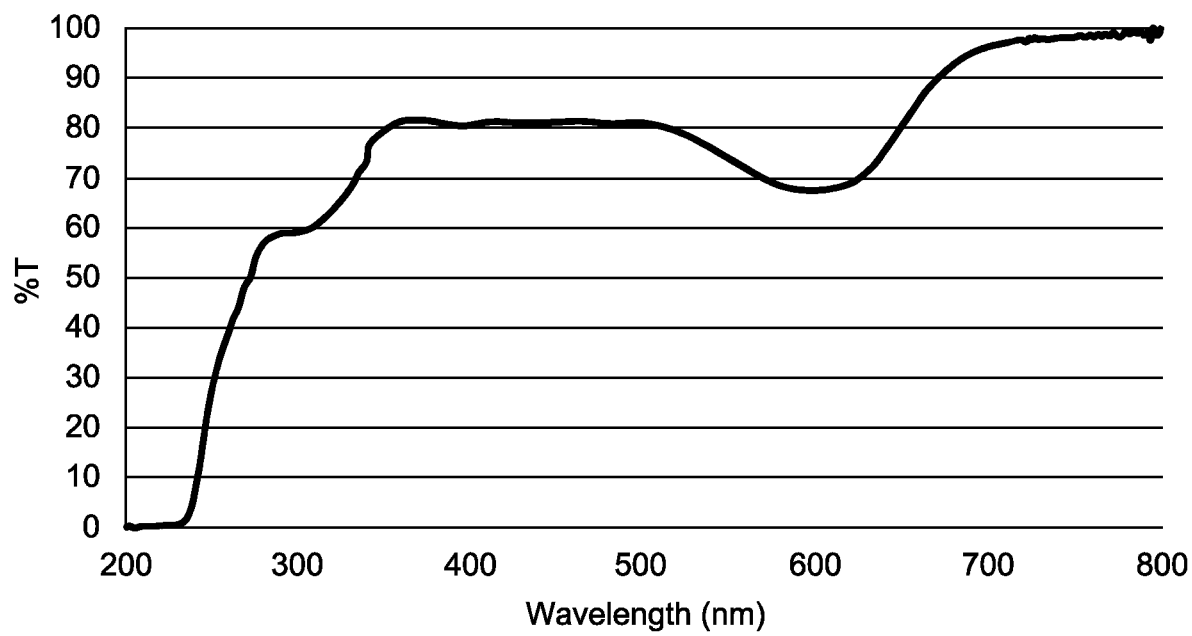

OPHTHALMIC DEVICES

The present application claims priority to U.S. Provisional Patent Application Ser. No. 63/239,344, entitled "Ophthalmic Devices," filed Aug. 31, 2021, the content of which is incorporated by reference herein in its entirety.

BACKGROUND

This disclosure generally relates to ophthalmic devices such as contact lenses for slowing, inhibiting or preventing myopia progression.

Ophthalmic devices such as contact lenses are made of various polymeric materials, including rigid gas permeable materials, soft elastomeric materials, and soft hydrogel materials. The majority of contact lenses sold today are made of soft hydrogel materials. Hydrogels are a cross-linked polymeric system that absorb and retain water, typically 10 to 80 percent by weight. Hydrogel lenses are commonly prepared by polymerizing a lens-forming monomeric mixture. In the case of silicone hydrogel lenses, a silicone-containing monomer is copolymerized with a hydrophilic monomer.

In the field of ophthalmic devices, various physical and chemical properties such as, for example, oxygen permeability, wettability, material strength and stability are but a few of the factors that must be carefully balanced in order to provide a useable contact lens. For example, since the cornea receives its oxygen supply from contact with the atmosphere, oxygen permeability is an important characteristic for certain contact lens material. Wettability also is important in that, if the lens is not sufficiently wettable, it does not remain lubricated and therefore cannot be worn comfortably in the eye. Accordingly, the optimum contact lens would have at least both excellent oxygen permeability and excellent tear fluid wettability.

SUMMARY

In accordance with an exemplary embodiment, a method for making an ophthalmic device for slowing, inhibiting or preventing myopia progression comprises contacting an ophthalmic device having one or more reactive functional groups with one or more red-light blocking compounds having one or more reactive functional groups complementary to the one or more reactive functional groups of the ophthalmic device in the presence of a base for a time period sufficient to covalently bond at least one of the one or more reactive functional groups of the ophthalmic device with at least one of the one or more reactive functional groups of the one or more red-light blocking compounds, wherein the one or more red-light blocking compounds block greater than about 5% to about 25% of red-light transmission through the ophthalmic device at a wavelength of from about 550 nanometers (nm) to about 800 nm.

In accordance with another illustrative embodiment, a modified ophthalmic device for slowing, inhibiting or preventing myopia progression comprises one or more red-light blocking compounds having at least one reactive functional group covalently bonded to at least one reactive functional group of an unmodified ophthalmic device, wherein the one or more red-light blocking compounds block greater than about 5% to about 25% of red-light transmission through the modified ophthalmic device at a wavelength of from about 550 nm to about 800 nm.

In accordance with yet another illustrative embodiment, a method for slowing, inhibiting or preventing myopia progression in a subject in need thereof comprises (a) providing a modified ophthalmic device for slowing, inhibiting or preventing myopia progression which comprises one or more red-light blocking compounds having at least one reactive functional group covalently bonded to at least one reactive functional group of an unmodified ophthalmic device, wherein the one or more red-light blocking compounds block greater than about 5% to about 25% of red-light transmission through the modified ophthalmic device at a wavelength of from about 550 nm to about 800 nm; and (b) inserting the ophthalmic device into an eye of the subject.

BRIEF DESCRIPTION OF THE DRAWING

Exemplary embodiments of the present disclosure will be described below in more detail, with reference to the accompanying drawing, of which:

FIG. 1 is a graph illustrating the percent transmission of red-light through the lens of Example 1.

DETAILED DESCRIPTION

Various illustrative embodiments described herein are directed to ophthalmic devices for slowing, inhibiting or preventing myopia progression in a subject in need thereof, e.g., a human. In general, natural light consists of different monochromatic lights with different wavelengths, which may not focus on the same plane on the retina. A longer wavelength monochromatic light can focus on the plane behind the retina whereas a shorter wavelength monochromatic light can focus on the plane in front of the retina. The different focuses of the lights may contribute to a backward displacement of the retina toward the eye's image plane leading to elongation of the eye. This can result in various pathologies including myopia.

Myopia ("nearsightedness") is a vision condition where objects near to a viewer appear clear, but objects that are spaced farther away from the viewer get progressively blurred. Myopia can be caused by multiple reasons. One factor in many cases of myopia is an elongated axial length of the eye. Myopia occurs when the focal point of the focused light is formed before the retina. In other words, the focal point of the light rays entering the eye stop short of the retina. Thus, myopic eyes focus in front of the retinal plane. Myopia typically develops because the axial length of the eye grows to be longer than the focal length of the optical components of the eye, that is, the eye grows too long.

It is believed that excessive stimulation of L cones in a person's eye (especially in children), may result in non-optimal eye lengthening and myopia. By spectrally filtering red-light using an ophthalmic device containing one or more red-light blocking compounds, myopia can be further reduced in a wearer. However, present dyes (or colorants) of such red-light blocking compounds typically used to manufacture tinted soft contact lenses often leach out and the lenses lose their original tint when subjected to sterilization conditions or during prolonged storage. Thus, there is a need for an improved ophthalmic device which can filter and/or block red-light thereby inhibiting or preventing myopia in a wearer of the ophthalmic device.

Accordingly, the modified ophthalmic devices described herein overcome the foregoing problems and advantageously provide for at least one of slowing, inhibiting or preventing myopia progression by covalently bonding at least one reactive functional group of an unmodified ophthalmic device with at least one reactive functional group of the one or more red-light blocking compounds, wherein the one or more red-light blocking compounds block greater than about 5% to about 25% of red-light transmission through the modified ophthalmic device at a wavelength of from about 550 nanometers (nm) to about 800 nm.

The ophthalmic devices disclosed herein are intended for direct contact with body tissue or body fluid. As used herein, the term "ophthalmic device" refers to devices that reside in or on the eye. These devices can provide optical correction, wound care, drug delivery, diagnostic functionality or cosmetic enhancement or effect or a combination of these properties. Useful ophthalmic devices include, but are not limited to, ophthalmic lenses such as soft contact lenses, e.g., a soft, hydrogel lens, soft, non-hydrogel lens and the like, hard contact lenses, e.g., a hard, gas permeable lens material and the like, intraocular lenses, overlay lenses, ocular inserts, optical inserts and the like. As is understood by one skilled in the art, a lens is considered to be "soft" if it can be folded back upon itself without breaking.

As used herein, the term "(meth)" denotes an optional methyl substituent. Thus, for example, terms such as "(meth) acrylate" denotes either methacrylate or acrylate, and "(meth)acrylamide" denotes either methacrylamide or acrylamide.

In non-limiting illustrative embodiments, ophthalmic devices are obtained from a polymerization product of a monomeric mixture comprising one or more ophthalmic device-forming monomers. In one illustrative embodiment, an ophthalmic device for use herein includes an ophthalmic device which is formed from material hydrophilic per se, since reactive groups, e.g., carboxy, carbamoyl, sulfate, sulfonate, phosphate, amine, ammonium or hydroxy groups, are inherently present in the material and also at the surface of an ophthalmic device manufactured therefrom. Suitable hydrophilic monomers having such reactive groups include, for example, unsaturated carboxylic acids, amides, vinyl lactams, poly(alkyleneoxy)(meth)acrylates, (meth)acrylic substituted alcohols, hydrophilic vinyl carbonates, hydrophilic vinyl carbamates, hydrophilic oxazolones, and poly(alkene glycols) functionalized with polymerizable groups and the like and mixtures thereof.

Representative examples of unsaturated carboxylic acids include methacrylic acid, acrylic acid and the like and mixtures thereof. Representative examples of amides include acrylamides such as N,N-dimethylacrylamide, N,N-dimethylmethacrylamide and the like and mixtures thereof. Representative examples of cyclic lactams include N-vinyl-2-pyrrolidone, N-vinyl caprolactam, N-vinyl-2-piperidone and the like and mixtures thereof. Representative examples of (meth)acrylic substituted alcohols include 2-hydroxyethylmethacrylate, 2-hydroxyethylacrylate, glyceryl methacrylate and the like and mixtures thereof. Representative examples of functionalized poly(alkene glycols) include poly(diethylene glycols) of varying chain length containing monomethacrylate or dimethacrylate end caps. In one embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. Mixtures of the foregoing hydrophilic monomers can also be used in the monomeric mixtures herein.

Representative examples of suitable hydrophilic bulk materials include, but are not limited to, polymacon, tefilcon, methafilcon, deltafilcon, bufilcon, phemfilcon, ocufilcon, focofilcon, etafilcon, hefilcon, vifilcon, tetrafilcon, perfilcon, droxifilcon, dimefilcon, isofilcon, mafilcon, nelfilcon, atlafilcon and the like. Examples of other suitable bulk materials include balafilcon A, hilafilcon A, alphafilcon A, bilafilcon B and the like.

In another embodiment, an ophthalmic device includes an ophthalmic device which is formed from materials which are amphiphilic segmented copolymers containing at least one hydrophobic segment and at least one hydrophilic segment which are linked through a bond or a bridge member.

In an illustrative embodiment, an ophthalmic device includes an ophthalmic device which is formed from materials not hydrophilic per se. Such ophthalmic devices are formed from materials known in the art and include, by way of example, polysiloxanes, perfluoropolyethers, fluorinated poly(meth)acrylates or equivalent fluorinated polymers derived, e.g., from other polymerizable carboxylic acids, polyalkyl(meth)acrylates or equivalent alkylester polymers derived from other polymerizable carboxylic acids, or fluorinated polyolefins, such as fluorinated ethylene propylene polymers, or tetrafluoroethylene, preferably in combination with a dioxol, e.g., perfluoro-2,2-dimethyl-1,3-dioxol. Representative examples of suitable bulk materials include, but are not limited to, lotrafilcon A, neofocon, pasifocon, telefocon, silafocon, fluorsilfocon, paflufocon, silafocon, elastofilcon, fluorofocon or Teflon® AF materials, such as Teflon® AF 1600 or Teflon® AF 2400 which are copolymers of about 63 to about 73 mol % of perfluoro-2,2-dimethyl-1,3-dioxol and about 37 to about 27 mol % of tetrafluoroethylene, or of about 80 to about 90 mol % of perfluoro-2,2-dimethyl-1,3-dioxol and about 20 to about 10 mol % of tetrafluoroethylene. Combinations of the hydrophilic monomers and hydrophobic monomers are also contemplated herein.

In an illustrative embodiment, it is useful to employ biocompatible materials herein including both soft and rigid materials commonly used for ophthalmic lenses, including contact lenses. In general, non-hydrogel materials are hydrophobic polymeric materials that do not contain water in their equilibrium state. Typical non-hydrogel materials comprise silicone acrylics, such as those formed from a bulky silicone monomer (e.g., tris(trimethylsiloxy)silylpropyl methacrylate, commonly known as "TRIS" monomer), methacrylate end-capped poly(dimethylsiloxane)prepolymer, or silicones having fluoroalkyl side groups (polysiloxanes are also commonly known as silicone polymers).

Hydrogels in general are a well-known class of materials that comprise hydrated, crosslinked polymeric systems containing water in an equilibrium state. Accordingly, hydrogels are copolymers prepared from hydrophilic monomers. In the case of silicone hydrogels, the hydrogel copolymers are generally prepared by polymerizing a mixture containing at least one device-forming silicone-containing monomer and at least one device-forming hydrophilic monomer. Either the silicone-containing monomer or the hydrophilic monomer can function as a crosslinking agent (a crosslinker being defined as a monomer having multiple polymerizable functionalities) or a separate crosslinker may be employed. Silicone hydrogels typically have a water content between about 10 to about 80 weight percent.

The monomeric mixtures may also include a second device-forming monomer including a copolymerizable group and a reactive functional group. The copolymerizable group can be an ethylenically unsaturated group, such that this device-forming monomer copolymerizes with the hydrophilic and/or hydrophobic device-forming monomer and any other device-forming monomers in the initial device-forming monomer mixture. Additionally, the second monomer can include a reactive functional group that reacts with a complementary reactive group of the copolymer which is the reaction product of, for example, one or more polymerizable polyhydric alcohols and one or more polymerizable fluorine-containing monomers. In other words, after the device is formed by copolymerizing the device-forming monomer mixture, the reactive functional groups provided by the second device-forming monomers remain to react with a complementary reactive moiety of the copolymer.

In an illustrative embodiment, reactive groups of the second device-forming monomers can include epoxide groups. Accordingly, second device-forming monomers are those that include both an ethylenically unsaturated group (that permits the monomer to copolymerize with the hydrophilic device-forming monomer) and the epoxide group (that does not react with the hydrophilic device-forming monomer but remains to react with a copolymer, e.g., the reaction product of one or more polymerizable polyhydric alcohols and one or more polymerizable fluorine-containing monomers). Suitable second device-forming monomers include, for example, glycidyl methacrylate, glycidyl acrylate, glycidyl vinylcarbonate, glycidyl vinylcarbamate, and 4-vinyl-1-cyclohexene-1,2-epoxide.

As mentioned, one class of ophthalmic device substrate materials are silicone hydrogels. In this case, the initial device-forming monomer mixture further comprises a silicone-containing monomer. Applicable silicone-containing monomeric materials for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995. Specific examples of suitable materials for use herein include those disclosed in U.S. Pat. Nos. 5,310,779; 5,387,662; 5,449,729; 5,512,205; 5,610,252; 5,616,757; 5,708,094; 5,710,302; 5,714,557 and 5,908,906, the contents of which are incorporated by reference herein.

Representative examples of applicable silicone-containing monomers include one or more non-bulky organosilicon-containing monomers. An "organosilicon-containing monomer" as used herein contains at least one [siloxanyl] or at least one [silyl-alkyl-siloxanyl] repeating unit, in a monomer, macromer or prepolymer. In one embodiment, an example of a non-bulky organosilicon-containing monomers is represented by a structure of Formula (Ia):

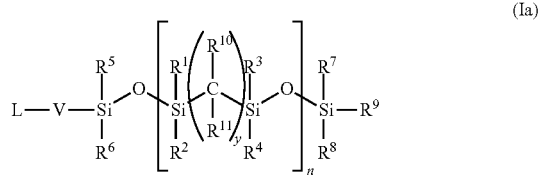

(Ia)

wherein V is ethylenically unsaturated polymerizable group, L is a linker group or a bond; $R^1$, $R^2$, $R^3$, $R^4$, $R^5$, $R^6$, $R^7$, $R^8$, and $R^9$ are independently H, $C_1$ to $C_{12}$ alkyl, halo alkyl, $C_3$ to $C_{12}$ cycloalkyl, heterocycloalkyl, $C_2$ to $C_{12}$ alkenyl, haloalkenyl, or $C_6$ to $C_{12}$ aromatic; $R^{10}$, and $R^{11}$ are independently H or $C_1$ to $C_{12}$ alkyl wherein at least one of $R^{10}$ and $R^{11}$ is hydrogen; y is 2 to 7 and n is 1 to 100 or from 1 to 20.

Ethylenically unsaturated polymerizable groups are well known to those skilled in the art. Suitable ethylenically unsaturated polymerizable groups include, for example, (meth)acrylates, vinyl carbonates, 0-vinyl carbamates, N-vinyl carbamates, and (meth)acrylamides.

Linker groups can be any divalent radical or moiety and include, for example, substituted or unsubstituted $C_1$ to $C_{12}$ alkyl, alkyl ether, alkenyls, alkenyl ethers, halo alkyls, substituted or unsubstituted siloxanes, and monomers capable of propagating ring opening.

In one embodiment, V is a (meth)acrylate, L is a $C_1$ to $C_{12}$ alkylene, $R^1$, $R^2$, $R^3$, $R^4$, $R^5$, $R^6$, $R^7$, $R^8$, and $R^9$ are independently a $C_1$ to $C_{12}$ alkyl, $R^{10}$ and $R^{11}$ are independently H, y is 2 to 7 and n is 3 to 8.

In one embodiment, V is a (meth)acrylate, L is a $C_1$ to $C_6$ alkyl, $R^1$, $R^2$, $R^3$, $R^4$, $R^5$, $R^6$, $R^7$, $R^8$, and $R^9$ are independently a $C_1$ to $C_6$ alkyl, $R^{10}$ and $R^{11}$ are independently H, y is 2 to 7 and n is 1 to 20.

Non-bulky organosilicon-containing monomers represented by a structure of Formula Ia are known in the art, see, e.g., U.S. Pat. Nos. 7,915,323, 7,994,356, 8,420,711, 8,827,447 and 9,039,174, the contents of which are incorporated by reference herein.

In one embodiment, one or more non-bulky organosilicon-containing monomers can comprise a compound represented by a structure of Formula (Ib):

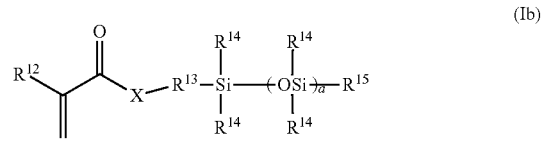

(Ib)

wherein $R^{12}$ is H or methyl; X is O or $NR^{16}$; wherein $R^{16}$ is selected from H, or $C_1$ to $C_4$ alkyl, which may be further substituted with one or more hydroxyl groups, and in some embodiments is H or methyl; $R^{13}$ is a divalent alkyl group, which may further be functionalized with a group selected from the group consisting of ether groups, hydroxyl groups, carbamate groups and combinations thereof, and in another embodiment $C_1$ to $C_6$ alkylene groups which may be substituted with ether, hydroxyl and combinations thereof, and in yet another embodiment $C_1$ or $C_3$ to $C_4$ alkylene groups which may be substituted with ether, hydroxyl and combinations thereof, each $R^{14}$ is independently a phenyl or $C_1$ to $C_4$ alkyl which may be substituted with fluorine, hydroxyl or ether, and in another embodiment each $R^{14}$ is independently selected from ethyl and methyl groups, and in yet another embodiment, each $R^{14}$ is methyl; $R^{15}$ is a $C_1$ to $C_4$ alkyl; a is 2 to 50, and in some embodiments 5 to 15.

Non-bulky organosilicon-containing monomers represented by a structure of Formula Ib are known in the art, see, e.g., U.S. Pat. Nos. 8,703,891, 8,937,110, 8,937,111, 9,156,934 and 9,244,197, the contents of which are incorporated by reference herein.

In one illustrative embodiment, the one or more non-bulky organosilicon-containing monomers can be present in the monomeric mixture in an amount ranging from about 5 wt. % to about 50 wt. %, based on the total weight of the monomeric mixture. In one embodiment, the one or more non-bulky organosilicon-containing monomers can be present in the monomeric mixture in an amount ranging from about 15 wt. % to about 45 wt. %, based on the total weight of the monomeric mixture.

Representative examples of applicable silicone-containing monomers also include bulky polysiloxanylalkyl(meth)

acrylic monomers. An example of a bulky polysiloxanylal-kyl(meth)acrylic monomer is represented by a structure of Formula (II):

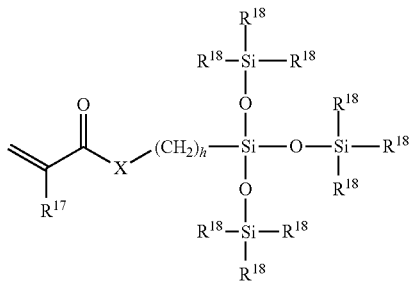

(II)

wherein X denotes —O— or —NR$^{19}$— where each R$^{19}$ is hydrogen or a C$_1$-C$_4$ alkyl; R$^{17}$ independently denotes hydrogen or methyl; each R$^{18}$ independently denotes a lower alkyl radical, a phenyl radical or a group represented by the following structure:

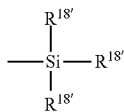

wherein each R$^{18'}$ independently denotes a lower alkyl radical or a phenyl radical; and h is 1 to 10; or the following structure of Formula (III):

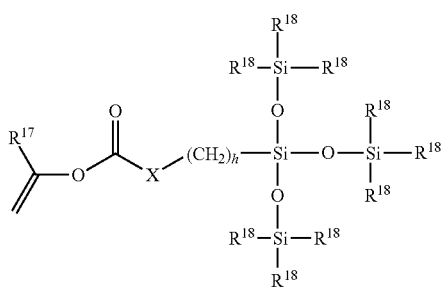

(III)

wherein X denotes —NR$^{19}$—; wherein R$^{19}$ denotes hydrogen or a C$_1$-C$_4$ alkyl; R$^{17}$ denotes hydrogen or methyl; each R$^{18}$ independently denotes a lower alkyl radical, a phenyl radical or a group represented by the following structure:

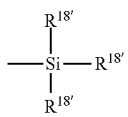

wherein each R$^{18'}$ independently denotes a lower alkyl radical or a phenyl radical; and h is 1 to 10.

Examples of bulky monomers include methacryloxypropyl tris(trimethyl-siloxy)silane or tris(trimethylsiloxy)silylpropyl methacrylate, sometimes referred to as TRIS and tris(trimethylsiloxy)silylpropyl vinyl carbamate, sometimes referred to as TRIS-VC and the like.

Such bulky monomers may be copolymerized with a silicone macromonomer, which is a poly(organosiloxane) capped with an unsaturated group at two or more ends of the molecule. U.S. Pat. No. 4,153,641 discloses, for example, various unsaturated groups such as acryloxy or methacryloxy groups.

Another class of representative silicone-containing monomers includes, for example, silicone-containing vinyl carbonate or vinyl carbamate monomers such as, for example, 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris(trimethylsiloxy)silyl]propyl vinyl carbamate; 3-[tris(trimethylsiloxy)silyl]propyl allyl carbamate; 3-[tris(trimethylsiloxy)silyl]propyl vinyl carbonate; t-butyldimethylsiloxyethyl vinyl carbonate; trimethylsilylethyl vinyl carbonate; trimethylsilylmethyl vinyl carbonate and the like and mixtures thereof.

Another class of silicone-containing monomers includes polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai, Yu-Chin, "The Role of Bulky Polysiloxanylalkyl Methacryates in Polyurethane-Polysiloxane Hydrogels," Journal of Applied Polymer Science, Vol. 60, 1193-1199 (1996). PCT Published Application No. WO 96/31792 discloses examples of such monomers, which disclosure is hereby incorporated by reference in its entirety. Further examples of silicone urethane monomers are represented by Formulae (IV) and (V):

$$E(*D*A*D*G)_a*D*A*D*E'; \text{ or} \quad (IV)$$

$$E(*D*G*D*A)_a*D*A*D*E'; \text{ or} \quad (V)$$

wherein:
D independently denotes an alkyl diradical, an alkyl cycloalkyl diradical, a cycloalkyl diradical, an aryl diradical or an alkylaryl diradical having 6 to about 30 carbon atoms;
G independently denotes an alkyl diradical, a cycloalkyl diradical, an alkyl cycloalkyl diradical, an aryl diradical or an alkylaryl diradical having 1 to about 40 carbon atoms and which may contain ether, thio or amine linkages in the main chain;
* denotes a urethane or ureido linkage;
a is at least 1; A independently denotes a divalent polymeric radical of Formula (VI):

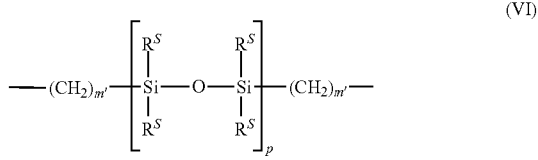

(VI)

wherein each R$^S$ independently denotes an alkyl or fluoro-substituted alkyl group having 1 to about 10 carbon atoms which may contain ether linkages between the carbon atoms; m' is at least 1; and p is a number that provides a moiety weight of about 400 to about 10,000;
each of E and E' independently denotes a polymerizable unsaturated organic radical represented by Formula (VII):

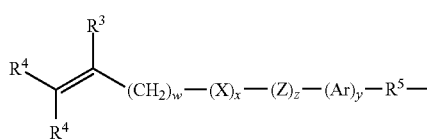

wherein: R$^3$ is hydrogen or methyl;

$R^4$ is hydrogen, an alkyl radical having 1 to 6 carbon atoms, or a —CO—Y—$R^6$ radical wherein Y is —O—, —S— or —NH—;
$R^5$ is a divalent alkylene radical having 1 to about 10 carbon atoms;
$R^6$ is a alkyl radical having 1 to about 12 carbon atoms;
X denotes —O— or —OCO—;
Z denotes —O— or —NH—;
Ar denotes an aromatic radical having about 6 to about 30 carbon atoms;
w is 0 to 6; x is 0 or 1; y is 0 or 1; and z is 0 or 1.

In an illustrative embodiment, a silicone-containing urethane monomer is represented by Formula (VIII):

In another embodiment, another class of silicone-containing monomers includes monomers of Formula (IX):

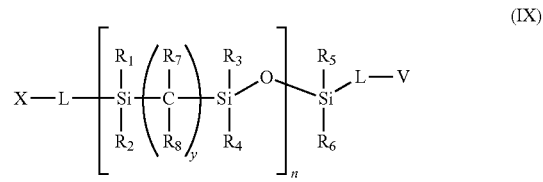

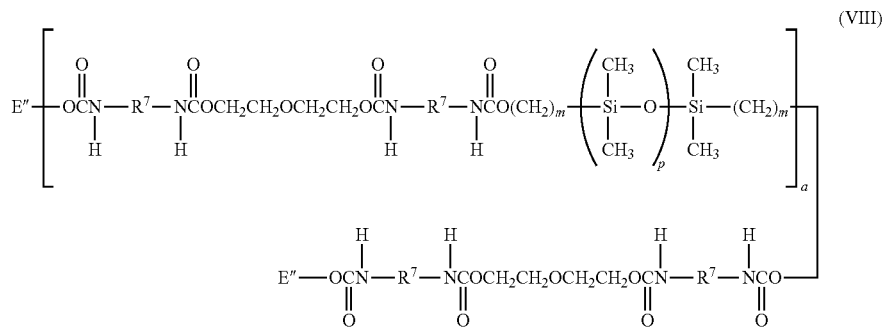

wherein m is at least 1 and is preferably 3 or 4, a is at least 1 and preferably is 1, p is a number which provides a moiety weight of about 400 to about 10,000 and is preferably at least about 30, $R^7$ is a diradical of a diisocyanate after removal of the isocyanate group, such as the diradical of isophorone diisocyanate, and each E" is a group represented by:

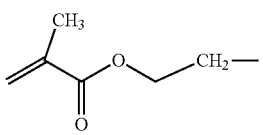

In another embodiment, a silicone hydrogel material comprises (in bulk, that is, in the monomer mixture that is copolymerized) about 5 to about 50 percent, or from about 10 to about 25, by weight of one or more silicone macromonomers, about 5 to about 75 percent, or about 30 to about 60 percent, by weight of one or more polysiloxanylalkyl (meth)acrylic monomers, and about 10 to about 50 percent, or about 20 to about 40 percent, by weight of a hydrophilic monomer. In general, the silicone macromonomer is a poly(organosiloxane) capped with an unsaturated group at two or more ends of the molecule. In addition to the end groups in the above structural formulas, U.S. Pat. No. 4,153,641 discloses additional unsaturated groups, including acryloxy or methacryloxy. Fumarate-containing materials such as those disclosed in U.S. Pat. Nos. 5,310,779; 5,449,729 and 5,512,205 are also useful substrates in accordance with the non-limiting embodiments described herein. The silane macromonomer may be a silicone-containing vinyl carbonate or vinyl carbamate or a polyurethane-polysiloxane having one or more hard-soft-hard blocks and end-capped with a hydrophilic monomer.

wherein X is the residue of a ring opening agent; L is the same or different and is a linker group or a bond; V is an ethylenically unsaturated polymerizable group; $R_1$, $R_2$, $R_3$, $R_4$, $R_5$, $R_6$ are independently H, alkyl, halo alkyl, cyclo alkyl, heterocyclo alkyl, alkenyl, halo alkenyl, or aromatic; $R_7$ and $R_8$ are independently H or alkyl wherein at least one of $R_7$ or $R_8$ is hydrogen; y is 2-7 and n is 1-100.

Ring opening agents are well known in the literature. Non-limiting examples of anionic ring opening agents include alkyl lithiums, alkoxides, trialkylsiloxylithium wherein the alkyl group may or may not contain halo atoms.

Linker groups can be any divalent radical or moiety and include substituted or unsubstituted alkyl, alkyl ether, alkenyls, alkenyl ethers, halo alkyls, substituted or unsubstituted siloxanes, and monomers capable of propagating ring opening.

Ethylenically unsaturated polymerizable groups are well known to those skilled in the art. Non-limiting examples of ethylenically unsaturated polymerizable groups would include acrylates, methacrylates, vinyl carbonates, 0-vinyl carbamates, N-vinyl carbamates, acrylamides and methacrylamides.

In another embodiment, a class of silicone-containing monomers includes monomers of Formula (X):

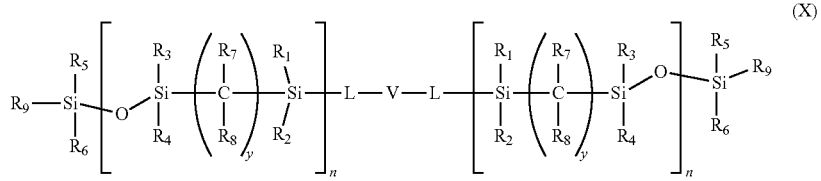

(X)

wherein L is the same or different and is a linker group or a bond; V is the same or different and is an ethylenically unsaturated polymerizable group; $R_1$, $R_2$, $R_3$, $R_4$, $R_5$, $R_6$ and $R_9$ are independently H, alkyl, halo alkyl, cyclo alkyl, heterocyclo alkyl, alkenyl, halo alkenyl, or aromatic; $R_7$ and $R_8$ are independently H or alkyl wherein at least one of $R_7$ or $R_8$ is hydrogen; y is 2-7 and n is 1-100.

In another embodiment, a class of silicone-containing monomers includes monomers of Formulas (XI) and (XII):

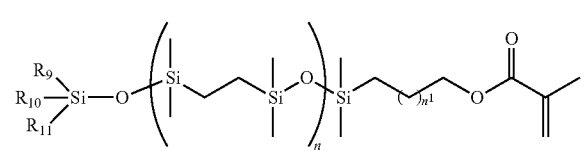

(XI)

wherein $R_9$, $R_{10}$ and $R_{11}$ are independently H, alkyl, haloalkyl or other substituted alkyl groups; n is as defined above and $n^1$ is 0-10; and,

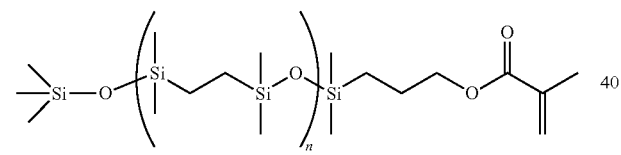

(XII)

wherein n is 1 to 100, or n is 2 to 80, or n is 3 to 20, or n is 5 to 15.

In another embodiment, a class of silicone-containing monomers includes monomers of Formulas (XIII)-(XVII):

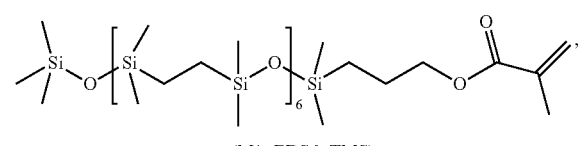

(XIII)

(M1- EDS6- TMS)

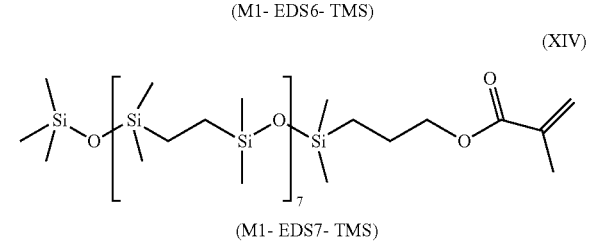

(XIV)

(M1- EDS7- TMS)

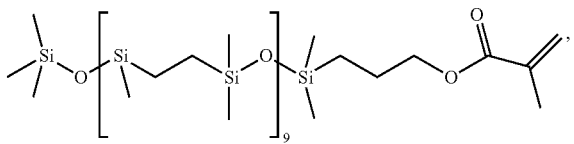

(XV)

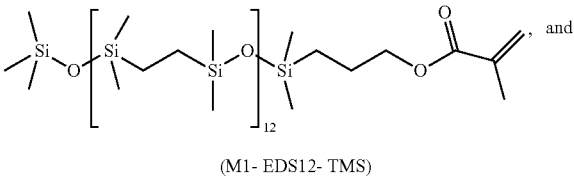

(XVI)

, and (M1- EDS12- TMS)

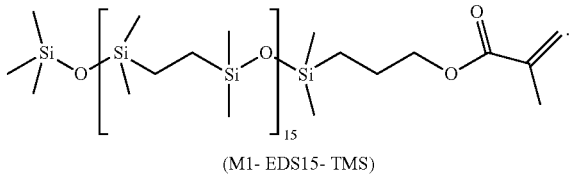

(XVII)

(M1- EDS15- TMS)

In another embodiment, a class of silicone-containing monomers includes monomers of Formulas (XVIII)-(XX):

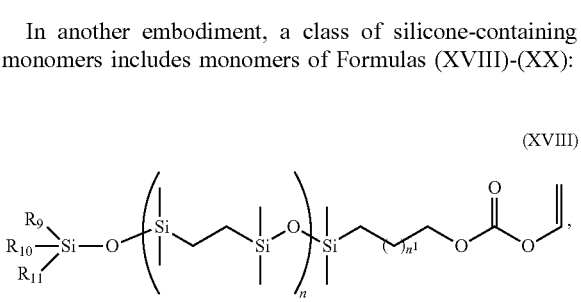

(XVIII)

(XIX)

, and (XX)

wherein $R_9$, $R_{10}$ and $R_{11}$ are independently H, alkyl, haloalkyl or other substituted alkyl groups and n and $n^1$ are as defined above.

In another embodiment, a class of silicone-containing monomers includes monomers of Formulas (XXI)-(XXIII):

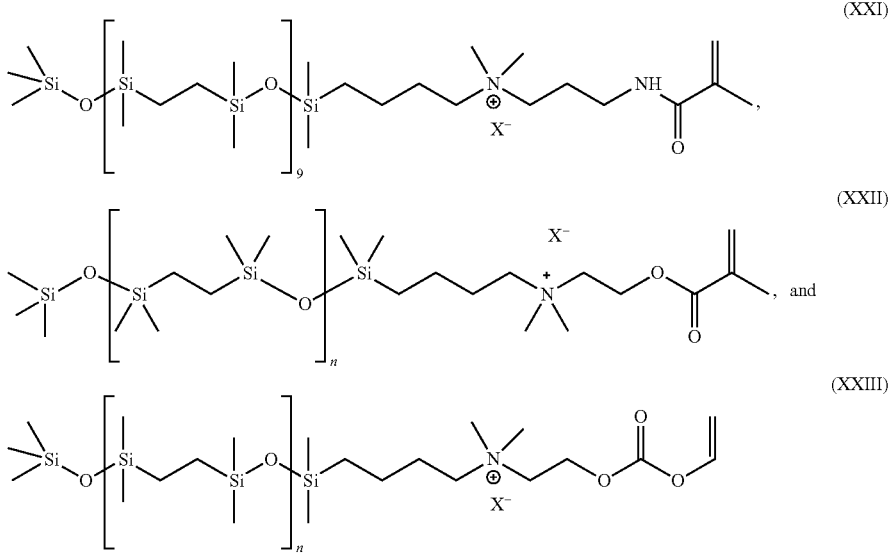

(XXI)

(XXII)

(XXIII)

wherein n is as defined above and $X^-$ is a counterion to provide an overall neutral charge.

Counterions capable of providing an overall neutral charge are well known to those of ordinary skill in the art and would include, for example, halide ions.

In another embodiment, a class of silicone-containing monomers includes monomers of Formula (XXIV):

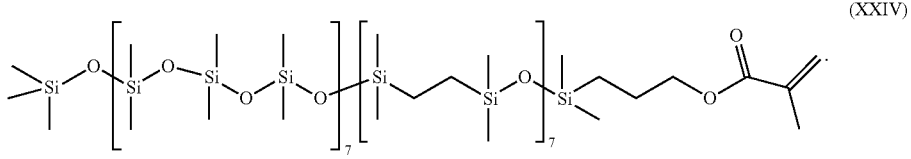

(XXIV)

Representative examples of alkyl groups for use herein include, by way of example, a straight or branched alkyl chain radical containing carbon and hydrogen atoms of from 1 to about 30 carbon atoms or from 1 to about 12 carbon atoms or from 1 to about 6 carbon atoms with or without unsaturation, to the rest of the molecule, e.g., methyl, ethyl, n-propyl, 1-methylethyl (isopropyl), n-butyl, n-pentyl, methylene, ethylene, etc., and the like. The alkyl group can optionally contain one or more heteroatoms, e.g., O and N, and the like to form haloalkyl groups.

Representative examples of cycloalkyl groups for use herein include, by way of example, a substituted or unsubstituted non-aromatic mono or multicyclic ring system of about 3 to about 30 carbon atoms or from 3 to about 6 carbon atoms such as, for example, cyclopropyl, cyclobutyl, cyclopentyl, cyclohexyl, perhydronapththyl, adamantyl and norbornyl groups, bridged cyclic groups or sprirobicyclic groups, e.g., spiro-(4,4)-non-2-yl and the like, optionally containing one or more heteroatoms, e.g., O and N, and the like to form halocycloalkyl groups.

Representative examples of aromatic groups for use herein include, by way of example, a substituted or unsubstituted monoaromatic or polyaromatic radical containing from about 6 to about 30 carbon atoms such as, for example, phenyl, naphthyl, tetrahydronapthyl, indenyl, biphenyl and the like, optionally containing one or more heteroatoms, e.g., O and N, and the like to form heteroaryl groups.

Representative examples of alkenyl groups for use herein include, by way of example, a substituted or unsubstituted alkyl group containing from about 2 to about 30 carbon atoms or from 3 to about 12 carbon atoms with at least one carbon-carbon double bond such as, for example, propenyl, butenyl, pentenyl and the like, wherein the alkenyl group can optionally contain one or more heteroatoms, e.g., O and N, and the like to form haloalkenyl groups.

Another class of representative silicone-containing monomers includes fluorinated monomers. Such monomers have been used in the formation of fluorosilicone hydrogels to reduce the accumulation of deposits on contact lenses made therefrom, as disclosed in, for example, U.S. Pat. Nos. 4,954,587; 5,010,141 and 5,079,319. Also, the use of silicone-containing monomers having certain fluorinated side groups, i.e., $-(CF_2)-H$, have been found to improve compatibility between the hydrophilic and silicone-containing monomeric units. See, e.g., U.S. Pat. Nos. 5,321,108 and 5,387,662.

The above silicone materials are merely exemplary, and other materials for use as substrates that have been disclosed in various publications and are being continuously developed for use in contact lenses and other medical devices can also be used. For example, an ophthalmic device can be formed from at least a cationic monomer such as cationic silicone-containing monomer or cationic fluorinated silicone-containing monomers.

As mentioned above, the ophthalmic device used herein will have reactive functional groups inherently present in or at the surface of the device. However, if the ophthalmic device contains too few or no functional groups, the surface of the device can be modified by known techniques, for example, plasma chemical methods or conventional functionalization with groups such as —OH, —NH$_2$ or —CO$_2$H. For example, the surface of the ophthalmic device can be treated with a plasma discharge or corona discharge to introduce or increase the population of the reactive functional groups of the ophthalmic device. The type of gas introduced into the treatment chamber will depend on the desired type of reactive functional group. By way of example, in one illustrative embodiment, hydroxyl surface groups can be produced with a treatment chamber atmosphere containing water vapor or an alcohol. In another illustrative embodiment, carboxyl surface groups can be produced with a treatment chamber atmosphere containing oxygen, air or another oxygen-containing gas. In another illustrative embodiment, amino surface groups can be produced with a treatment chamber atmosphere containing ammonia or an amine source. In another illustrative embodiment, mercaptan surface groups can be produced with a treatment chamber atmosphere containing sulfur-containing gases such as organic mercaptans or hydrogen sulfide. As one skilled in the art will readily appreciate, a combination of any of the foregoing gases can be used in the treatment chamber to produce a combination of reactive functional groups on the surface of the ophthalmic device. Methods and apparatus for surface treatment by plasma discharge are disclosed in, for example, U.S. Pat. Nos. 6,550,915 and 6,794,456, the contents of which are incorporated by reference herein.

In non-limiting illustrative embodiments, suitable reactive functional groups of the ophthalmic devices described herein include a wide variety of groups well known to the skilled artisan. Representative examples of such reactive functional groups include, but are not limited to, hydroxy groups, amino groups, carboxy groups, carbonyl groups, aldehyde groups, sulfonic acid groups, sulfonyl chloride groups, isocyanato groups, carboxy anhydride groups, lactone groups, azlactone groups, epoxy groups and groups being replaceable by amino or hydroxy groups, such as halo groups, or mixtures thereof. In non-limiting illustrative embodiments, the reactive functional groups of the ophthalmic device include one or more of an amino group, a hydroxy group and a carboxy group.

Methods for making the ophthalmic device are within the purview of one skilled in the art and/or are commercially available from such sources and Bausch & Lomb, Incorporated, Johnson & Johnson, etc.

The one or more red-light blocking compounds having one or more reactive functional groups complementary to the one or more reactive functional groups of the ophthalmic device comprise red-light blocking compounds blocking greater than about 5% to about 25% of red-light transmission through the modified ophthalmic device disclosed herein at a wavelength of from about 550 nanometers (nm) to about 800 nm. In an illustrative embodiment, the one or more red-light blocking compounds having one or more reactive functional groups complementary to the one or more reactive functional groups of the ophthalmic device comprise one or more red-light blocking compounds blocking greater than about 5% to about 25% of red-light transmission through the modified ophthalmic device disclosed herein at a wavelength of from about 550 nm to about 700 nm. In an illustrative embodiment, the one or more red-light blocking compounds having one or more reactive functional groups complementary to the one or more reactive functional groups of the ophthalmic device comprise one or more red-light blocking compounds blocking greater than about 5% to about 25% of red-light transmission through the modified ophthalmic device disclosed herein at a wavelength of from about 650 nm to about 680 nm.

In an illustrative embodiment, the one or more red-light blocking compounds having one or more reactive functional groups complementary to the one or more reactive functional groups of the ophthalmic device comprise one or more red-light blocking compounds blocking from about 10% to about 15% of red-light transmission through the modified ophthalmic device disclosed herein at a wavelength of from about 550 nm to about 800 nm. In an illustrative embodiment, the one or more red-light blocking compounds having one or more reactive functional groups complementary to the one or more reactive functional groups of the ophthalmic device comprise one or more red-light blocking compounds blocking from about 10% to about 15% of red-light transmission through the modified ophthalmic device disclosed herein at a wavelength of from about 550 nm to about 700 nm. In an illustrative embodiment, the one or more red-light blocking compounds having one or more reactive functional groups complementary to the one or more reactive functional groups of the ophthalmic device comprise one or more red-light blocking compounds blocking greater from about 10% to about 15% of red-light transmission through the modified ophthalmic device disclosed herein at a wavelength of from about 650 nm to about 680 nm.

In an illustrative embodiment, the one or more reactive functional groups of the red-light blocking compounds which are complementary to the one or more reactive functional groups of the ophthalmic device are sulfonate groups or vinyl sulfone groups. For example, in illustrative non-limiting embodiments, one class of red-light blocking compounds includes halotriazine compounds for reaction with the one or more reactive functional groups of the ophthalmic device. Suitable halotriazine compounds are dihalotriazine compounds, such as dichlorotriazine compounds with at least one sulfonate functionality to render the compound water-soluble. The halotriazine compounds can be anionic compounds. Such dichlorotriazine compounds are described in, for example, U.S. Pat. Nos. 4,559,059 and 4,891,046, each of which is incorporated by reference herein. An example of a dichlorotriazine compound is Color Index Reactive Blue 4 which has the chemical name 2-anthracenesulfonic acid, 1-amino-4-(3-((4,6-dichloro-s-triazin-2-yl)amino)-4-sulfoanilino)-9,10-dihydro-9,10-dioxo. Monochlorotriazine compounds with at least one sulfonate functionality such as Reactive Blue #2 can also be reacted with the one or more reactive functional groups of the ophthalmic device. In addition, water soluble compounds which can be utilized in addition to Color Index Reactive Blue 4 include the compound which is sold under the names Procion Blue MRS or Fiber Reactive Brilliant Blue MRS. This dye has the chemical name 2-anthracenesulfonic acid, 1-amino-4-(3-((4,6-dichloro-s-triazin-2-yl)amino)-4-sulfoanilino)-9,10-dihydro-9,10-dioxo, disodium salt, or the chemical name 2-anthracenesulfonic acid, 1-amino-4-(3-((4, 6-dichloro-1,3,5-triazin-2-yl)amino)-4-sulfophenyl)amino)-9,10-dihydro-9,10-dioxo, disodium salt.

In non-limiting illustrative embodiments, another class of red-light blocking compounds includes water soluble vinyl sulfone compounds, such as Color Index Reactive Black #5 (Remazol Black B, CAS 17095-24-8).

Representative structures of the red-light blocking compounds for use herein include the following compounds:

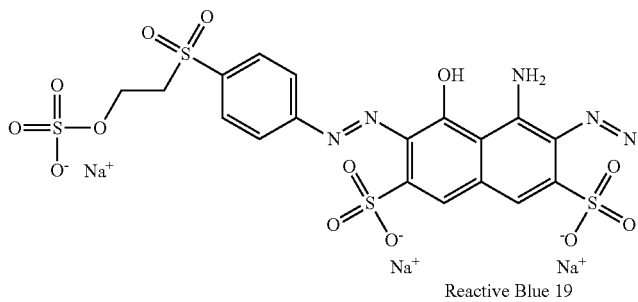
Reactive Blue 19

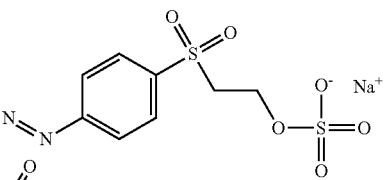
Reactive Blue 4

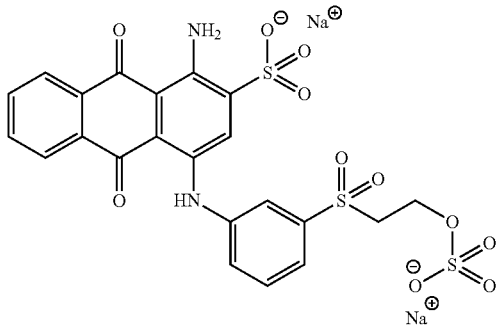

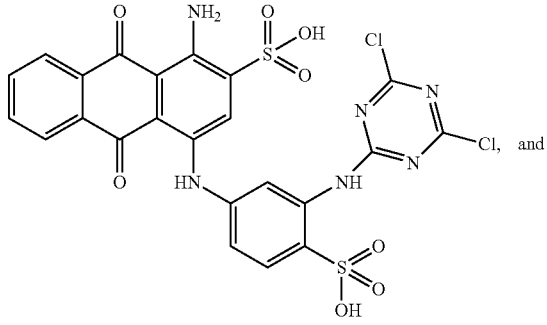
Reactive Blue 2

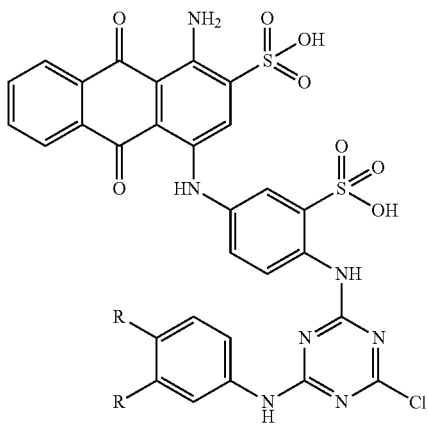

R: H or SO$_3$Na (one of each)

The foregoing unmodified ophthalmic devices having one or more reactive functional groups are contacted with the one or more red-light blocking compounds having one or more reactive functional groups complementary to the one or more reactive functional groups of the ophthalmic device in the presence of base for a time period sufficient to covalently bond at least one of the one or more reactive functional groups of the ophthalmic device with at least one of the one or more reactive functional groups of the one or more red-light blocking compounds. This is illustrated below in the non-limiting Scheme I.

Scheme I

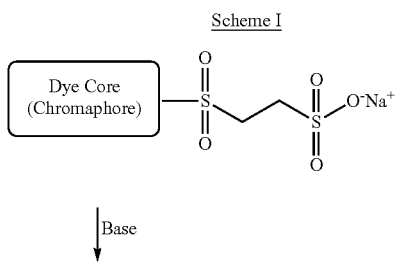

↓ Base

-continued

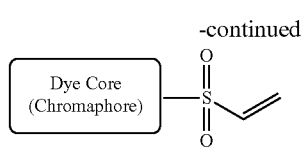

Hydroxyl end group
R—OH

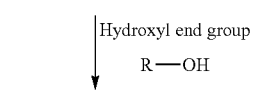

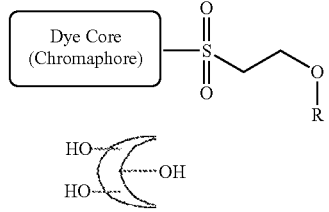

↓

-continued

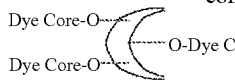

As one skilled in the art will readily appreciate, the base is employed to activate the vinyl sulfone and neutralize any acid which is formed during the reaction between the ophthalmic device and the one or more red-light blocking compounds. For example, the vinyl sulfone will react with a nucleophilic functionality on the lens (e.g., amine, hydroxyl, etc.) in the fashion of a Michael Addition to form a covalent bond. A suitable base may be, for example, an organic or inorganic base. In an illustrative embodiment, a suitable inorganic base includes, for example, alkali metal or alkali earth metal hydroxides such as sodium hydroxide, potassium hydroxide, calcium hydroxide, and lithium hydroxide; alkali metal or alkali earth metal alkoxides such as sodium methoxide, potassium methoxide, sodium tert-butoxide, and potassium tert-butoxide; alkali metal or alkali earth metal carbonates such as sodium carbonate, and potassium carbonate, and alkali metal or alkali earth metal bicarbonates such as sodium bicarbonate, and potassium bicarbonate and the like. In an illustrative embodiment, a suitable organic base includes, for example, triethyl amine, trimethyl amine, pyridine, diisopropyl ethyl amine, pyridine and dimethyl amino pyridine.

In an illustrative embodiment, a molar amount of the base is equal to or greater than the molar amount of the one or more red-light blocking compounds such as from about 1:1 to about 5:1. In an illustrative embodiment, the reaction is carried out at a temperature from room temperature to about 45° C., for about 5 seconds to about 18 hours.

Following the reaction, removal of extractable components from the ophthalmic device can be carried out by contacting the lens with one or more extraction solvents for a time period sufficient to ensure substantially complete removal of the components. Suitable extraction solvents include, for example, water, a low molecular weight alcohol extraction solvent, an aliphatic hydrocarbon extraction solvent, a cycloaliphatic hydrocarbon extraction solvent, a ketone extraction solvent, a nitrile extraction solvent, an ether extraction solvent, an amido group-containing extraction solvent and mixtures thereof.

Suitable low molecular weight alcohol extraction solvents include, for example, low molecular weight alcohols having about 1 to about 13 carbon atoms and/or a molecular weight of no greater than about 200. A suitable low molecular alcohol can be selected from a variety of low-molecular-weight monohydric alcohols, each comprising about 1 to about 13 carbon atoms. Suitable monohydric alcohols include, for example, methanol, ethanol, propanol, isopropyl alcohol, butanol, isobutyl alcohol, tert-butyl alcohol, hexanol, 2-ethylhexanol, dodecanol, and the like. Suitable aliphatic or cycloaliphatic hydrocarbon solvents include, for example, pentane, hexane, heptane, cyclohexane and the like.

Suitable ketone extraction solvents include, for example, acetone, methyl ethyl ketone, diethyl ketone, methyl propyl ketone, methyl isopropyl ketone, ethyl propyl ketone, ethyl isopropyl ketone, dipropyl ketone, diisopropyl ketone, methyl butyl ketone, methyl isobutyl ketone, methyl sec butyl ketone, methyl tert-butyl ketone, ethyl butyl ketone, ethyl isobutyl ketone, ethyl sec-butyl ketone, ethyl tert-butyl ketone, propyl butyl ketone, isopropyl butyl ketone, propyl isobutyl ketone, propyl sec-butyl ketone, propyl tert butyl ketone, isopropyl isobutyl ketone, isopropyl sec-butyl ketone, isopropyl tert-butyl ketone, dibutyl ketone, diisobutyl ketone, di-sec-butyl ketone, di-tert-butyl ketone, butyl isobutyl ketone, butyl sec-butyl ketone, butyl tert-butyl ketone, isobutyl sec-butyl ketone, isobutyl tert-butyl ketone, sec-butyl tert-butyl ketone, 5-heptanone, 5-methyl-2-hexanone (methyl isoamyl ketone), 4-methyl-2-hexanone, 3-methyl-2-hexanone, 3,4-dimethyl-2-pentanone, 3,3-dimethyl-2-pentanone, 4,4-dimethyl-2-pentanone, 3-octanone, 4-methyl-3-heptanone, 5-methyl-3-heptanone, 6-methyl-3-heptanone, 4,4-dimethyl-3-hexanone, 4,5-dimethyl-3-hexanone, 5,5-dimethyl-3-hexanone, 4-nonanone, 5-methyl-4-octanone, 6-methyl-4-octanone, 7-methyl-4-octanone, 5,5-dimethyl-4-heptanone, 5,6-dimethyl-4-heptanone, 6,6-dimethyl-4-heptanone, 2-undecanone, cyclopropanone, cyclobutanone, cyclopentanone, cyclohexanone, cycloheptanone, cyclooctanone, cyclononanone, cyclodecanone, cycloundecanone, cyclododecanone and the like and combinations thereof. In one embodiment, a ketone solvent is acetone.

Suitable nitrile extraction solvents include, for example, saturated or unsaturated aliphatic, alicyclic, or aromatic compounds containing a nitrile group. Included within the nitriles are compounds containing heteroatom such as those selected from Groups 13, 14, 15, 16 and 17 of the Periodic Table of Elements. Representative examples of nitriles for use herein include acetonitrile; propionitrile; isopropionitrile; butyronitrile; isobutyronitrile; valeronitrile; isovaleronitrile; trimethylacetonitrile; hexanenitrile; heptanenitrile; heptyl cyanide; octyl cyanide; undecanenitrile; malononitrile; succinonitrile; glutaronitrile; adiponitrile; sebaconitrile; allyl cyanide; acrylonitrile; crotononitrile; methacrylonitrile; fumaronitrile; tetracyanoethylene; cyclopentanecarbonitrile; cyclohexanecarbonitrile; dichloroacetonitrile; fluoroacetonitrile; trichloroacetonitrile; benzonitrile; benzyl cyanide; 2-methylbenzyl cyanide; 2-chlorobenzonitrile; 3-chlorobenzonitrile; 4-chlorobenzonitrile; o-tolunitrile; m-tolunitrile; p-tolunitrile and the like and mixtures thereof. In one embodiment, a nitrile solvent is acetonitrile.

Suitable ether extraction solvents include, for example, dialkyl ethers wherein the alkyl groups are the same or different and are from 1 to about 12 carbon atoms. Representative examples of an ether solvent include dimethylether, diethylether, di-i-propylether; dioxane, tetrahydrofuran, pyran and the like and mixtures thereof. In one embodiment, an ether solvent is tetrahydrofuran.

Suitable amido group-containing extraction solvents include, for example, dimethyl formamide, N-methyl formanilide, N-formyl piperidine, N-formyl morpholine, dimethyl acetamide, N-methyl pyrrolidone, N,N-dimethyl benzamide and mixtures thereof. In one embodiment, an amido group-containing solvent is N-methyl pyrrolidone.

In an illustrative embodiment, the one or more extraction solvents can further include water to form an extraction solution. For example, an extraction solution can be a blend containing from about 25 wt. % to about 75 wt. % of the one or more extraction solvents and from about 75 wt. % to about 25 wt. % water. In another embodiment, a blend can contain from about 40 wt. % to about 60 wt. % of the one or more extraction solvents and from about 60 wt. % to about 40 wt. % water.

In an illustrative embodiment, the modified ophthalmic device is contacted with the one or more extraction solvents or blend of the one or more extraction solvents and water for a time period ranging from about 5 minutes to about 120 minutes. In another embodiment, the modified ophthalmic device is contacted with the one or more extraction solvents or blend of the one or more extraction solvents and water for a time period ranging from about 10 minutes to about 40 minutes.

In an illustrative embodiment, the ophthalmic device is extracted in a series of the one or more extraction solvents or blend of the one or more extraction solvents and water as discussed hereinabove. For example, the modified ophthalmic device is first contacted with the one or more extraction solvents or a blend of the one or more extraction solvents and water for a time period ranging from about 5 minutes to about 120 minutes, or from about 10 minutes to about 40 minutes. Next, the modified ophthalmic device is removed from the solution or blend and contacted in another one or more extraction solvents or blend of the one or more extraction solvents and water time period ranging from about 5 minutes to about 120 minutes.

In an illustrative embodiment, following the foregoing extraction, the modified ophthalmic device is contacted in a series of water extractions for a time period ranging from about 5 minutes to about 120 minutes for each extraction.

In another step, the extracted modified ophthalmic device is sterilized. In an illustrative embodiment, the extracted modified ophthalmic device is sterilized by submerging the extracted modified ophthalmic device in a suitable buffered saline such as a borate buffered saline and then subjecting it to autoclave conditions for about 5 minutes to about 60 minutes. In one illustrative embodiment, the extracted ophthalmic device is subjected to autoclave conditions for about 5 minutes to about 2 hours.

The sterilized ophthalmic device is then rinsed with water and positioned in its packaging with borate buffered saline. The package is sealed and again the ophthalmic device is subjected to autoclave conditions.

Alternatively, the extracted modified ophthalmic device can be placed in a container that includes a receptacle portion to hold the extracted modified ophthalmic device and a sterile packaging solution. Examples of the container are conventional ophthalmic device blister packages. This receptacle, containing the extracted ophthalmic device immersed in the solution, is hermetically sealed, for example, by sealing lidstock on the package over the receptacle. For example, the lidstock is sealed around a perimeter of the receptacle. The solution and extracted modified ophthalmic device are sterilized while sealed in the package receptacle.

Examples of sterilization techniques include subjecting the solution and the extracted ophthalmic device to thermal energy, microwave radiation, gamma radiation or ultraviolet radiation. A specific example involves heating the solution and the extracted ophthalmic device, while sealed in the package container, to a temperature of at least about 100° C., or at least about 121° C., such as by autoclaving.

The following examples are provided to enable one skilled in the art to practice the invention and are merely illustrative. The examples should not be read as limiting the scope of the invention as defined in the claims.

In the examples, the following abbreviations are used.
DMA: N,N-dimethylacrylamide.
HEMA: 2-hydroxyethyl methacrylate.
NVP: N-vinyl-2-pyrrolidone.
EGDMA: Ethylene glycol dimethacrylate.
SIGMA: (3-methacryloxy-2-hydroxypropoxy)propyl bis (trimethylsiloxy)methylsilane
TRIS: 3-[Tris(trimethylsiloxy)silyl]propyl methacrylate.
Irgacure 819: a photoinitiator for free radical polymerization available from Sigma Aldrich.
CIX-4: a compound having the structure:

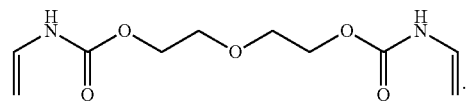 [SMILES: C=CNC(=O)OCCOCCOC(=O)NC=C]

Ma2D37: a compound having the following structure and available from Shin-Etsu and Gelest:

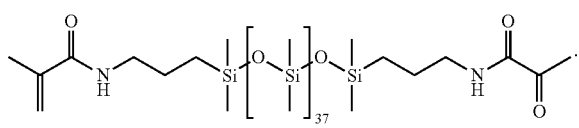

M1EDS6: a compound having the following structure and available from Gelest:

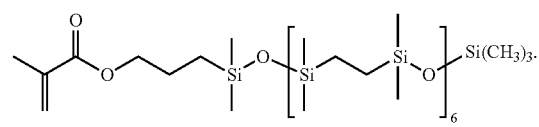

Example 1

A red-light blocker having the following structure was used in this example.

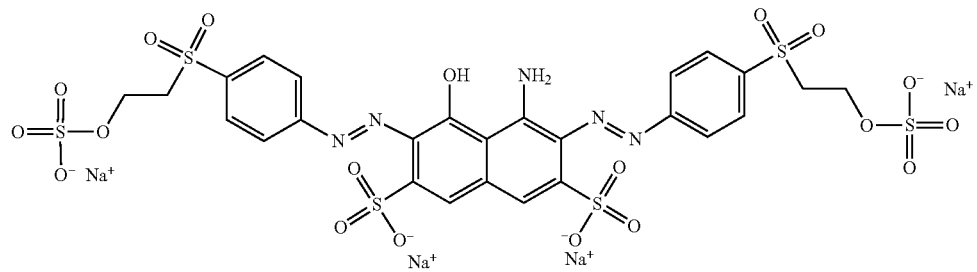

The ophthalmic lens used in this example was prepared from the formulation set forth below in Table 1, where the components are listed in amounts per weight.

TABLE 1

| Formulation | |
|---|---|
| Tris | 31.30 |
| Ma2D37 | 5.40 |
| M1EDS6 | 14.10 |
| NVP | 32.40 |
| EGDMA | 0.14 |
| HEMA | 1.90 |
| DMA | 7.10 |
| Hexanol | 7.30 |
| Irgacure 819 | 0.30 |
| CIX-4 | 0.06 |

The ophthalmic lens was soaked in a 50:50 isopropyl alcohol (IPA):$H_2O$ solution for 20 minutes to swell the lens, thereby making the internal hydroxyl groups accessible to react with red-light blocker. Next, the lens was placed in a 0.1 N NaOH solution containing 0.01 wt. % of the red-light blocker for 3 hours. The lens was then extracted in a series of solutions beginning with a 50:50 IPA:$H_2O$ solution for 10 minutes, followed by 100% IPA for 30 minutes, followed by 50:50 IPA:$H_2O$ solution for 10 minutes followed by 3× 100% water for 10 minutes each. The lens was then placed in a vial containing a borate buffer solution and autoclaved. The lens of Example 1 was then individually placed onto a horizontal integrating sphere for contact lens measurement. The transmittance spectrum was obtained from 200 nm to 800 nm. FIG. 1 is a graph illustrating the percent transmission of red-light through the lens of Example 1.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present compositions and are disclosed herein just as if each and every such sub-combination was individually and explicitly disclosed herein.

It will be understood that various modifications may be made to the illustrative non-limiting embodiments disclosed herein. Therefore, the above description should not be construed as limiting, but merely as exemplifications of preferred embodiments. For example, the functions described above and implemented as the best mode for operating the illustrative non-limiting embodiments are for illustration purposes only. Other arrangements and methods may be implemented by those skilled in the art without departing from the scope and spirit herein. Moreover, those skilled in the art will envision other modifications within the scope and spirit of the features and advantages appended hereto.

What is claimed is:

1. A modified silicone ophthalmic device which comprises one or more red-light blocking compounds having at least one reactive functional group covalently bonded to at least one reactive functional group of an unmodified silicone ophthalmic device, wherein the one or more red-light blocking compounds block greater than about 5% to about 25% of red-light transmission through the modified ophthalmic device at a wavelength of from about 550 nanometers (nm) to about 800 nm, wherein the unmodified silicone ophthalmic device is a polymerization product of a monomeric mixture comprising one or more silicone-containing monomers or prepolymers, wherein at least one of the one or more silicone-containing monomers or prepolymers include one or more non-bulky organosilicon-containing monomers containing at least one silyl-alkyl-siloxanyl repeating unit or one or more non-bulky organosilicon-containing prepolymers containing at least one silyl-alkyl-siloxanyl repeating unit.

2. The modified silicone ophthalmic device according to claim 1, wherein the one or more reactive functional groups of the unmodified silicone ophthalmic device includes one or more of an OH, $NH_2$ and $CO_2H$ group, and the one or more reactive functional groups of the one or more red-light blocking compounds comprise a sulfonate group.

3. The modified silicone ophthalmic device according to claim 1, wherein the one or more red-light blocking compounds comprise red-light blocking compounds blocking greater than about 5% to about 25% of red-light transmission through the modified silicone ophthalmic device at a wavelength of from about 550 nm to about 700 nm.

4. The modified silicone ophthalmic device according to claim 1, wherein the one or more red-light blocking compounds comprise red-light blocking compounds blocking greater than about 5% to about 25% of red-light transmission through the modified silicone ophthalmic device at a wavelength of from about 650 nm to about 680 nm.

5. The modified silicone ophthalmic device according to claim 1, wherein the one or more red-light blocking compounds are represented by one or more of the following compounds:

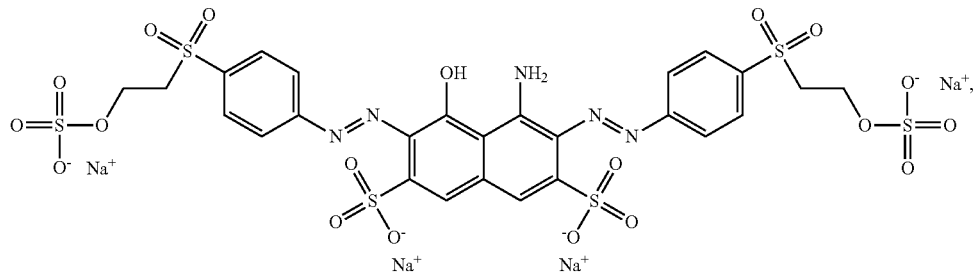

-continued

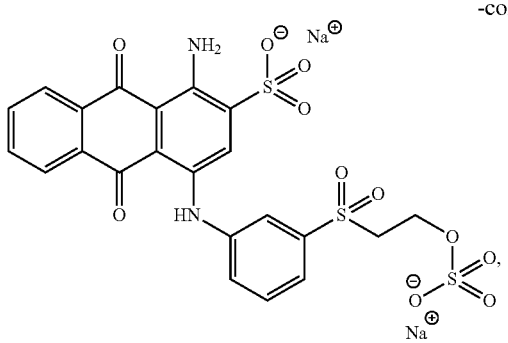

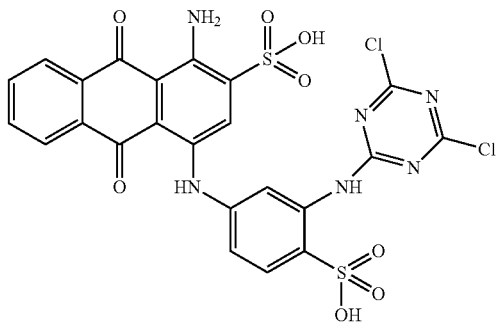

, and

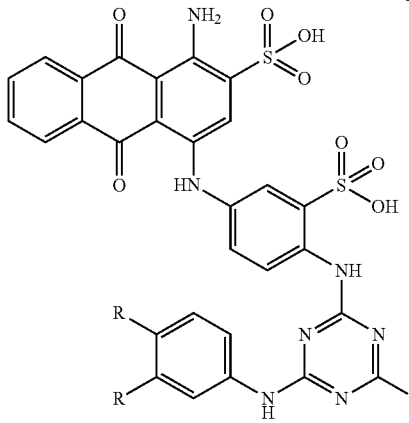

R: H or SO₃Na (one of each)

6. The modified silicone ophthalmic device according to claim 1, wherein the monomeric mixture further comprises one or more non-silicone-containing hydrophilic monomers.

7. The modified silicone ophthalmic device according to claim 6, wherein the monomeric mixture further comprises a crosslinking agent.

8. The modified silicone ophthalmic device according to claim 1, wherein the unmodified silicone ophthalmic device is one or more of a contact lens, an intraocular lens and a corneal implant.

9. The modified silicone ophthalmic device according to claim 1, wherein the one or more non-bulky organosilicon-containing monomers or prepolymers further include one or more non-bulky organosilicon-containing monomers or prepolymers containing at least one siloxanyl repeating unit.

10. The modified silicone ophthalmic device according to claim 1, wherein the one or more silicone-containing monomers or prepolymers include a bulky polysiloxanylalkyl (meth) acrylic monomers.

11. The modified silicone ophthalmic device according to claim 10, wherein the bulky polysiloxanylalkyl (meth) acrylic monomer is selected from the group consisting of methacryloxypropyl tris (trimethylsiloxy) silane, methacrylate and tris (trimethylsiloxy) silylpropyl vinyl tris (trimethylsiloxy) silylpropyl carbamate.

12. The modified silicone ophthalmic device according to claim 6, wherein the one or more non-silicone-containing hydrophilic monomers are selected from the group consisting of an unsaturated carboxylic acid, an acryl amide, a vinyl lactam and a (meth) acrylic substituted alcohol.

13. The modified silicone ophthalmic device according to claim 1, wherein the one or more non-bulky organosilicon-containing monomers containing at least one silyl-alkyl-siloxanyl repeating unit are represented by a formula:

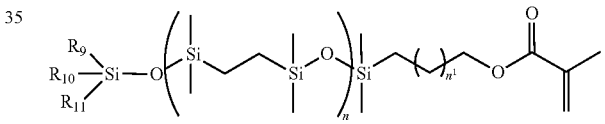

wherein $R_9$, $R_{10}$ and $R_{11}$ are independently hydrogen, an alkyl group, or a haloalkyl group, n is 1 to 100 and $n^1$ is 0 to 10.

14. The modified silicone ophthalmic device according to claim 1, wherein the one or more non-bulky organosilicon-containing monomers containing at least one silyl-alkyl-siloxanyl repeating unit or the one or more non-bulky organosilicon-containing prepolymer containing at least one silyl-alkyl-siloxanyl repeating unit are present in the monomeric mixture in an amount of from about 5 wt. % to about 50 wt. %, based on the total weight of the monomeric mixture.

15. The modified silicone ophthalmic device according to claim 1, wherein the one or more non-bulky organosilicon-containing monomers containing at least one silyl-alkyl-siloxanyl repeating unit or the one or more non-bulky organosilicon-containing prepolymer containing at least one silyl-alkyl-siloxanyl repeating unit are present in the monomeric mixture in an amount of from about 15 wt. % to about 45 wt. %, based on the total weight of the monomeric mixture.

16. The modified silicone ophthalmic device according to claim 6, wherein the one or more non-silicone-containing hydrophilic monomers comprise one or more of an unsaturated carboxylic acid, an acrylamide, a vinyl lactam, and a (meth) acrylic substituted alcohol.

17. The modified silicone ophthalmic device according to claim 6, wherein the one or more non-silicone-containing hydrophilic monomers comprise one or more of N,N-dimethylacrylamide, N-vinyl-2-pyrrolidone, 2-hydroxyethyl-methacrylate, and glyceryl methacrylate.

18. The modified silicone ophthalmic device according to claim 1, wherein the one or more silicone-containing monomers or prepolymers further include one or more bulky polysiloxanylalkyl (meth) acrylic monomers.

19. The modified silicone ophthalmic device according to claim 18, wherein the one or more bulky polysiloxanylalkyl (meth) acrylic monomers are represented by a formula:

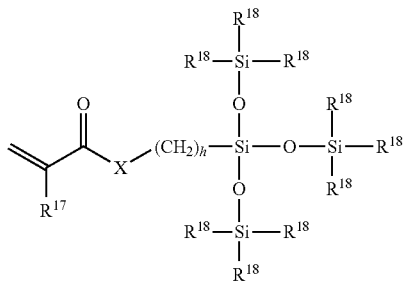

wherein X denotes —O— or —$NR^{19}$— where each $R^{19}$ is hydrogen or a $C_1$-$C_4$ alkyl; $R^{17}$ independently denotes hydrogen or methyl; each $R^{18}$ independently denotes an alkyl radical, a phenyl radical or a group represented by the following structure:

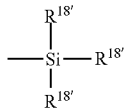

wherein each $R^{18'}$ independently denotes an alkyl radical or a phenyl radical; and h is 1 to 10; or the following structure of Formula (III):

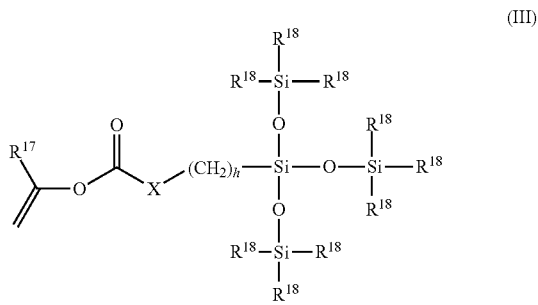

wherein X denotes —$NR^{19}$—; wherein $R^{19}$ denotes hydrogen or a $C_1$-$C_4$ alkyl; $R^{17}$ denotes hydrogen or methyl; each $R^{18}$ independently denotes an alkyl radical, a phenyl radical or a group represented by the following structure:

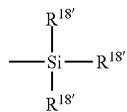

wherein each $R^{18'}$ independently denotes an alkyl radical or a phenyl radical; and h is 1 to 10.

20. The modified silicone ophthalmic device according to claim 1, wherein the modified silicone ophthalmic device inhibits myopia progression in a wearer of the modified silicone ophthalmic device as compared to the unmodified silicone ophthalmic device.

* * * * *